US012398853B2

(12) United States Patent
Chien et al.

(10) Patent No.: US 12,398,853 B2
(45) Date of Patent: Aug. 26, 2025

(54) LIGHT SOURCE SYSTEM

(71) Applicant: Qisda Corporation, Taoyuan (TW)

(72) Inventors: Chih-Shiung Chien, Taoyuan (TW); Ming-Kuen Lin, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 18/822,620

(22) Filed: Sep. 3, 2024

(65) Prior Publication Data

US 2025/0093004 A1 Mar. 20, 2025

(30) Foreign Application Priority Data

Sep. 19, 2023 (CN) ......................... 202311208559.9

(51) Int. Cl.
*F21S 41/176* (2018.01)
*F21S 41/20* (2018.01)
*F21S 41/25* (2018.01)

(52) U.S. Cl.
CPC ............. *F21S 41/176* (2018.01); *F21S 41/25* (2018.01); *F21S 41/285* (2018.01)

(58) Field of Classification Search
CPC ......... F21S 41/176; F21S 41/25; F21S 41/285
See application file for complete search history.

(56) References Cited

U.S. PATENT DOCUMENTS

| | | | | |
|---|---|---|---|---|
| 2021/0294192 A1* | 9/2021 | Shiratori | .............. | G03B 21/208 |
| 2022/0066306 A1* | 3/2022 | Uehara | ................ | G03B 21/204 |
| 2022/0109813 A1* | 4/2022 | Yasumatsu | ........... | G02B 5/0284 |
| 2023/0042973 A1* | 2/2023 | Fujita | ................... | G03B 21/208 |
| 2023/0259013 A1* | 8/2023 | Tanaka | .............. | G03B 21/2033 353/98 |
| 2023/0390864 A1* | 12/2023 | Sudo | .................. | B23K 26/0676 |
| 2023/0418142 A1* | 12/2023 | Yoshikawa | ........ | G03B 21/2073 |

FOREIGN PATENT DOCUMENTS

CN 109923443 B 5/2021

* cited by examiner

*Primary Examiner* — Christopher E Dunay

(57) ABSTRACT

A light source system includes a first light source and a beam conversion element. The first light source is configured to emit a first light. The beam conversion element is configured to convert the first light into a condensed light and a diffused light. The beam conversion element has a light transmission surface, the light transmission surface includes a flat region and a curved-surface region, the flat region completely surrounds the curved-surface region, the flat region is configured to convert the first light into the condensed light, and the curved-surface region is configured to convert the first light into the diffused light.

20 Claims, 9 Drawing Sheets

LIGHT SOURCE SYSTEM

This application claims the benefit of People's Republic of China application Serial No. 202311208559.9, filed on Sep. 19, 2023, the subject matter of which is incorporated herein by reference.

BACKGROUND OF THE INVENTION

Field of the Invention

The invention relates in general to a light source system.

Description of the Related Art

A conventional light source system provides a uniform illumination light. However, such uniform illumination light is not suitable for vehicle-mounted light source system. Therefore, proposing a light source system suitable for being mounted on a vehicle is one of the goals of those in this technical field.

SUMMARY OF THE INVENTION

According to an embodiment of the present invention, a light source system is provided. The light source system includes a first light source and a beam conversion element. The first light source is configured to emit a first light. The beam conversion element is configured to convert the first light into a condensed light and a diffused light. The beam conversion element has a light transmission surface, the light transmission surface includes a flat region and a curved-surface region, the flat region completely surrounds the curved-surface region, the flat region is configured to convert the first light into the condensed light, and the curved-surface region is configured to convert the first light into the diffused light.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
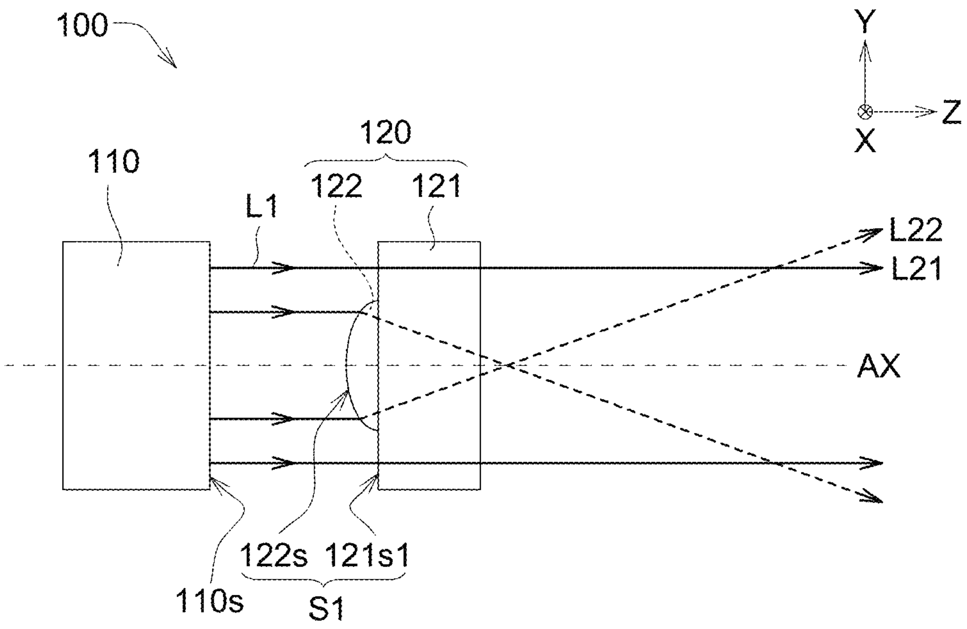
FIG. 1 illustrates a schematic diagram of a light source system 100 according to an embodiment of the present invention.
Figure 2:
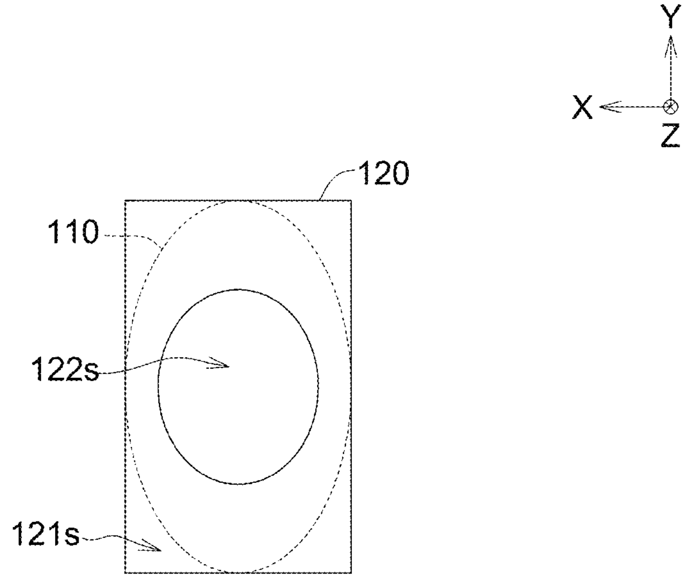
FIG. 2 illustrates a schematic diagram of a beam conversion element 120 of the light source system 100 in FIG. 1.
Figure 3A:
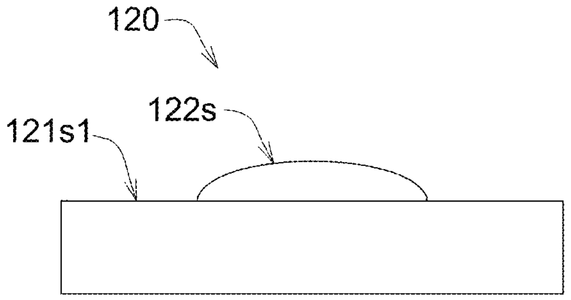
FIG. 3A illustrates a schematic diagram of the beam conversion element 120 of the light source system 100 in FIG. 2.
Figure 3B:
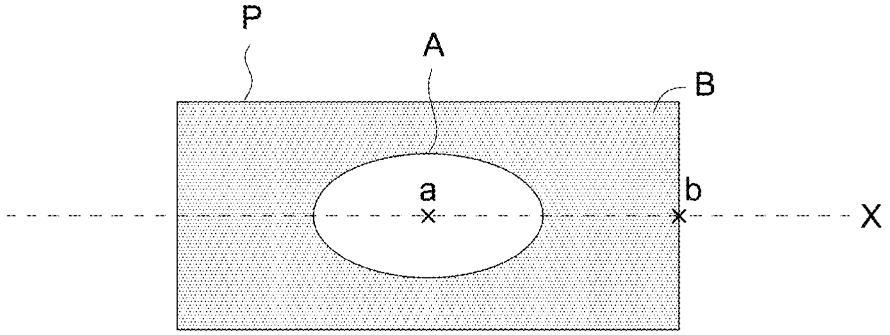
FIG. 3B illustrates a schematic diagram of a light pattern P obtained by using the beam conversion element 120 in FIG. 3A.
Figure 3C:
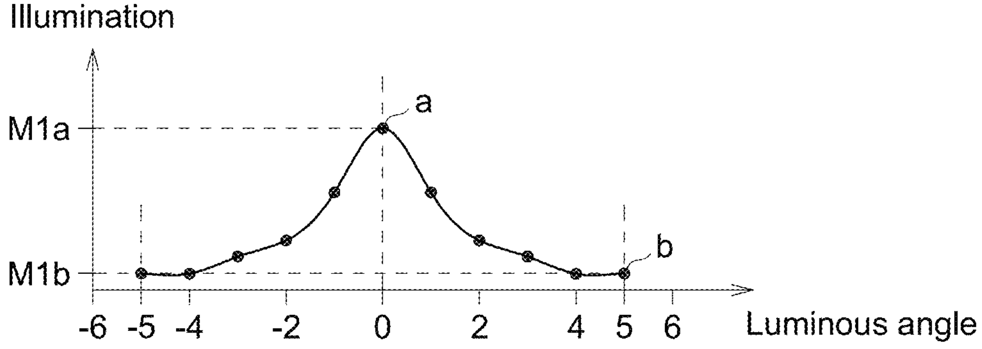
FIG. 3C illustrates a schematic diagram of a relationship between the luminous angle and the flux of the light pattern P in X-axis in FIG. 3B.
Figure 4A:
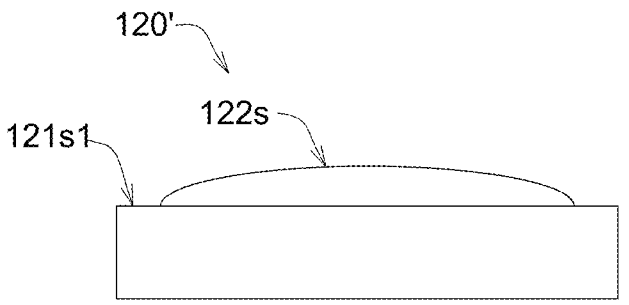
FIG. 4A illustrates a schematic diagram of a beam conversion element 120' according to another embodiment of the present invention.
Figure 4B:
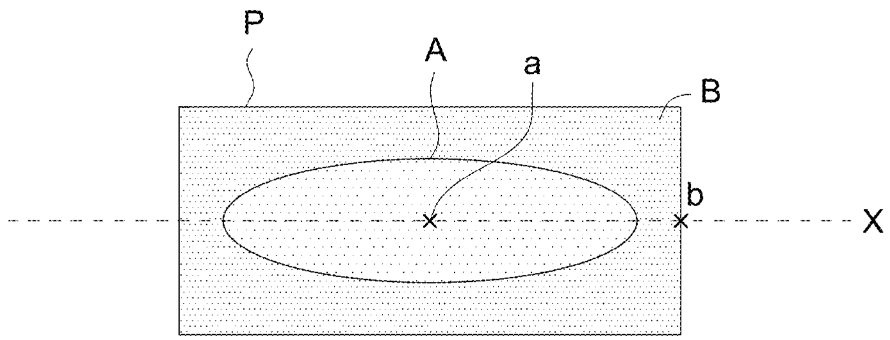
FIG. 4B illustrates a schematic diagram of a light pattern P obtained by using the beam conversion element 120' in FIG. 4A.
Figure 4C:
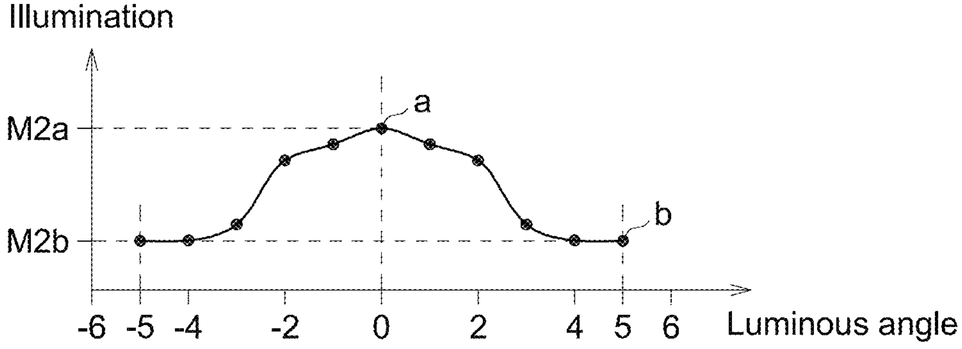
FIG. 4C illustrates a schematic diagram of a relationship between the luminous angle and the flux of the light pattern P in X-axis in FIG. 4B.

Referring to FIGS. 1 to 4C, FIG. 1 illustrates a schematic diagram of a light source system 100 according to an embodiment of the present invention, FIG. 2 illustrates a schematic diagram of a beam conversion element 120 of the light source system 100 in FIG. 1, FIG. 3A illustrates a schematic diagram of the beam conversion element 120 of the light source system 100 in FIG. 2, FIG. 3B illustrates a schematic diagram of a light pattern P obtained by using the beam conversion element 120 in FIG. 3A, FIG. 3C illustrates a schematic diagram of a relationship between the luminous angle and the flux of the light pattern P in X-axis in FIG. 3B, FIG. 4A illustrates a schematic diagram of a beam conversion element 120' according to another embodiment of the present invention, FIG. 4B illustrates a schematic diagram of a light pattern P obtained by using the beam conversion element 120' in FIG. 4A, and FIG. 4C illustrates a schematic diagram of a relationship between the luminous angle and the flux of the light pattern P in X-axis in FIG. 4B.

The light source system 100 may be applied to a vehicle-mounted lighting system, such as a car light, which may emit an illumination light to illuminate a scene ahead and/or a road surface.

As illustrated in FIG. 1, the light source system 100 includes a first light source 110 and a beam conversion element 120. The first light source 110 is configured to emit a first light L1. The beam conversion element 120 is configured to convert the first light L1 into a condensed light L21 and a diffused light L22. The beam conversion element 120 has a light transmission surface S1, wherein the light transmission surface S1 includes a flat region 121*s*1 and a curved-surface region 122*s*, wherein the flat region 121*s*1 completely surrounds (for example, 360 degrees) the curved-surface region 122*s*. The flat region 121*s*1 is configured to convert the first light L1 into the condensed light L21. The curved-surface region 122*s* is configured to convert the first light L1 into the diffused light L22. In the present embodiment, the condensed light L21 may enhance the intensity of the illumination light (for example, a mixed light of the condensed light L21 and the diffused light L22) of the light source system 100, and the diffused light L22 may increase the uniformity of the illumination light of the light source system 100, so that the illumination light provides a light pattern with a brighter brightness in a middle portion and a more uniform light intensity distribution in an edge portion.

As illustrated in FIG. 1, the light transmission surface S1 is, for example, a light-incident surface of the beam conversion element 120, but it may also be a light-exit surface of the beam conversion element 120.

As illustrated in FIG. 1, the first light L1, the condensed light L21 and the diffused light L22 have the same wavelength. In other words, the beam conversion element 120 does not change the wavelength of the first light L1. The first light source 110 is, for example, a laser light, and the first light L1 is, for example, a collimated light. However, the embodiment of the present invention does not limit the type of the first light source 110. As illustrated in FIGS. 1 and 2, the first light source 110 has a light-exit surface 110*s* that overlaps the entirety of the curved-surface region 122*s* along a direction of an optical axis AX of the first light L1, but it may also overlap a part of the curved-surface region 122*s*. Through an overlapping area between the light-exit surface 110*s* and the curved-surface region 122*s* along the optical axis AX of the first light L1, the light pattern and/or the light intensity distribution mode of the light emitted by the light source system 100 may be changed.

As illustrated in FIG. 2, in the present embodiment, the shape (e.g., top view shape) of the curved-surface region 122*s* of the beam conversion element 120 is an ellipse. In other embodiment, the shape of the curved-surface region 122*s* of the beam conversion element 120 may be a circle, a polygon (for example, a triangle, a quadrilateral, a pentagon, etc.) or an arbitrary shape constituted by a straight line, a curved line or a combination thereof. As long as the technical effect may be achieved, the shape of the curved-surface region 122*s* is not limited by the embodiment of the present invention. In addition, the light pattern of the illumination light projected by the light source system 100 may change according to the geometric shape of the curved-surface region 122*s*. For example, the light pattern of the illumination light projected by the light source system 100 is similar to the geometric shape of the curved-surface region 122*s*.

As illustrated in FIG. 1, the beam conversion element 120 includes a first portion 121 and a second portion 122, wherein the second portion 122 is connected to the first portion 121. The first portion 121 has the aforementioned flat region 121*s*1, and the second portion 122 has the aforementioned curved-surface region 122*s*. The second portion 122 protrudes relative to the flat region 121*s*1 of the first portion 121. In addition, the entirety of the beam conversion element 120 is, for example, an integrally formed structure (that is, the first portion 121 and the second portion 122 are integrally formed in one piece), and it may be formed of a material, for example, plastic or glass.

As illustrated in FIG. 1, the curved-surface region 122*s* may protrude relative to the flat region 121*s*1. As long as the light condensing effect may be achieved, the embodiment of the present invention does not limit the geometric form and/or the curvature distribution of the curved-surface region 122*s*.

The beam conversion element 120 in the embodiment of the present invention does not require all or almost of the first light L1 to be converted into the diffused light L22, and therefore it is not an "optical homogenizer". In an embodiment, different from the optical homogenizer, a flat proportion of the area of the flat region 121*s*1 of the beam conversion element 120 to the area of the light transmission surface S1 is substantially equal to or higher than 10%. In an embodiment, the flat proportion of the area of the flat region 121*s*1 to the area of the light transmission surface S1 is any real number between 10% and 90%. The higher the flat proportion is, the stronger the light intensity of the condensed light L21 is.

As illustrated in FIGS. 3A and 4A, the flat proportion of the beam conversion element 120 in FIG. 3A is larger than that of the beam conversion element 120' in FIG. 4A. As a result, as illustrated in FIGS. 3B and 3C, a ratio of the illumination (generated by the condensed light L21) of a middle region (the region A as illustrated in FIG. 3B) of the illumination light to the illumination (generated by the diffused light L22) of an edge region (the region B other than the region A as illustrated in FIG. 3B) of the illumination light which obtained by the beam conversion element 120 of the light source system 100 is greater. As illustrated in FIG. 4C, a ratio of the illumination (generated by the condensed light L21) of the middle region (the region A as illustrated in FIG. 4B) of the illumination light to the illumination (generated by the diffused light L22) of the edge region (the region B other than the region A as illustrated in FIG. 4B) of the illumination light which obtained by the beam conversion element 120' of the light source system 100 is less. It may be seen that the higher the flat proportion is, the stronger the light intensity of the condensed light L21 relative to the edge portion is. The luminous angle in FIGS. 3C and 4C is, for example, an angle included between the emitted-light of the light source system 100 and the optical axis AX (illustrated in FIG. 1).

In an embodiment, a ratio of the illumination at a center point (for example, point a in FIGS. 3C and 4C) of the light pattern to the illumination at an edge (for example, point b in FIGS. 3C and 4C) of the light pattern is M, wherein the ratio M may range between 3.5 and 17. Comparing the light pattern illumination distributions in FIGS. 3C and 4C, it may be seen that the ratio M1 (for example, M1=M1a/M1b) obtained by the beam conversion element 120 of the light source system 100 is greater than the ratio M2 (for example, M2=M2a/M2b) obtained by the beam conversion element 120' of the light source system 100. In other words, the greater the flat proportion is, the greater the ratio is.

Figure 5:
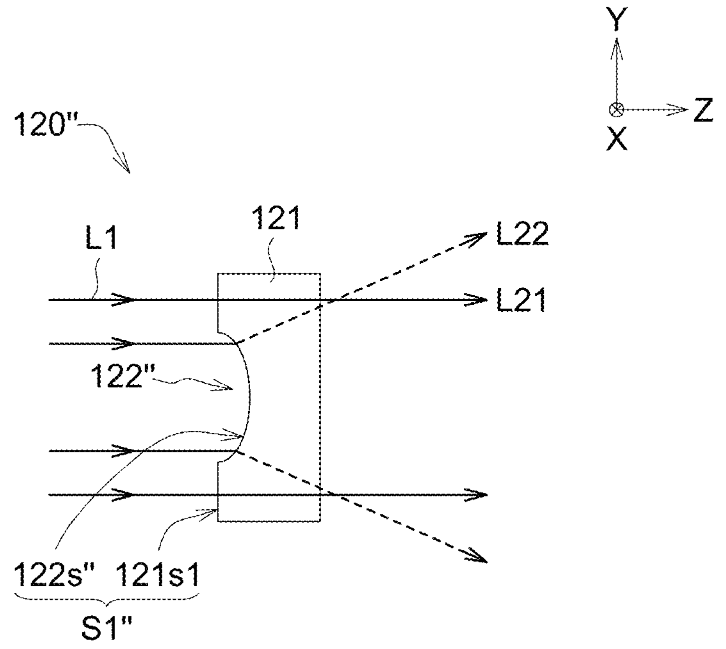
FIG. 5 illustrates a schematic diagram of a beam conversion element 120" according to another embodiment of the present invention.

Referring to FIG. 5, FIG. 5 illustrates a schematic diagram of a beam conversion element 120" according to another embodiment of the present invention. The beam conversion element 120" has a light transmission surface S1", wherein the light transmission surface S1" includes a flat region **121*s*1 and a curved-surface region 122*s*". The flat region 121*s*1 completely surrounds (for example, 360 degrees) the curved-surface region 122*s*". The flat region 121*s*1 is configured to convert the first light L1 into the condensed light L21, and the curved-surface region 122*s* is configured to convert the first light L1 into the diffused light L22. The beam conversion element 120" includes a first portion 121 and a second portion 122", wherein the first portion 121 has the aforementioned flat region 121*s*1, and the second portion 122" has the aforementioned curved-surface region 122*s*". In the present embodiment, the second portion 122" is recessed relative to the flat region 121*s*1 of the first portion 121. The curved-surface region 122*s*" of the second portion 122" is recessed relative to the flat region 121*s*1 of the first portion 121. The light transmission surface S1" is, for example, the light-incident surface of the beam conversion element 120", but it may also be the light-exit surface. In addition, the entirety of the beam conversion element 120" is, for example, an integrally formed structure (that is, the first portion 121 and the second portion 122"** are integrally formed into one piece), and it may be formed of a material including, for example, plastic or glass.

Figure 6:
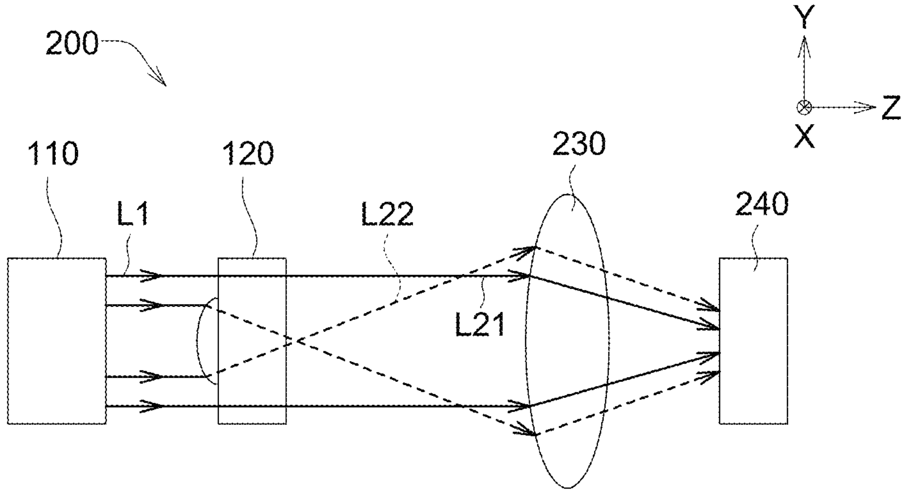
FIG. 6 is a schematic diagram of a light source system 200 according to another embodiment of the present invention.

Referring to FIG. 6, FIG. 6 is a schematic diagram of a light source system 200 according to another embodiment of the present invention. The light source system 200 includes the first light source 110, the beam conversion element 120, a lens 230 and a wavelength conversion element 240. The first light source 110 is configured to emit the first light L1. The beam conversion element 120 is configured to convert the first light L1 into condensed light L21 and diffused light L22. The beam conversion element 120 has the light transmission surface S1. The light transmission surface S1 includes the flat region **121*s*1 and the curved-surface region 122*s*. The flat region 121*s*1 completely surrounds the curved-surface region 122*s*. The flat region 121*s*1 is configured to convert the first light L1 into the condensed light L21. The curved-surface region 122*s* is configured to convert the first light L1 into the diffused light L22. In the present embodiment, the condensed light L21 may enhance the intensity of the illumination light (for example, the mixed light of the condensed light L21 and the diffused light L22) of the light source system 200, and the diffused light L22 may increase the uniformity of the illumination light of the light source system 200**, so that the illumination light provides a light pattern with a brighter brightness in the middle portion and the more uniform light intensity distribution in the edge portion.

As illustrated in FIG. 6, the beam conversion element 120 is disposed between the lens 230 and the first light source 110. The wavelength conversion element 120 is disposed on a downstream position of the lens 230. The condensed light L21 and the diffused light L22 have a first wavelength.

As illustrated in FIG. 6, the wavelength conversion element 240 is disposed on the downstream position of the lens 230 and is configured to convert the first wavelength into a second wavelength that is different from the first wavelength. In an embodiment, the first wavelength is, for example, a blue light wavelength, and the second wavelength is, for example, a white light wavelength or a yellow light wavelength. In an embodiment, the wavelength conversion element 240 includes phosphors which may convert or change the wavelength of light.

In addition, the structure of the beam conversion element is not limited by the aforementioned embodiments, and other structures of the beam conversion element will be further illustrated below.

Figure 7:
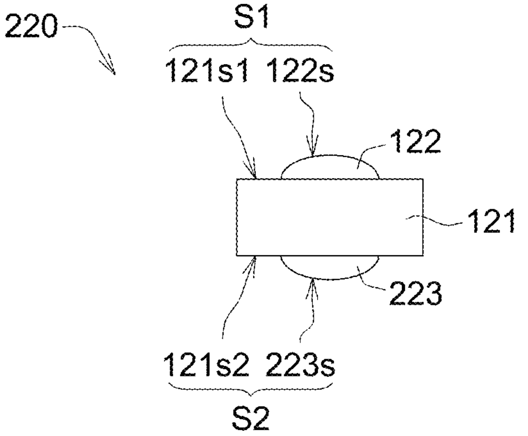
FIG. 7 illustrates a schematic diagram of a beam conversion element 220 according to another embodiment of the present invention.

Referring to FIG. 7, FIG. 7 illustrates a schematic diagram of a beam conversion element 220 according to another embodiment of the present invention. The beam conversion element 220 has the light transmission surface S1 and a light transmission surfaces S2 opposite to the light transmission surface S1. In the present embodiment, the light transmission surface S1 may be one of the light-incident surface and the light-exit surface of the beam conversion element 220, and the light transmission surface S2 may be the other one of the light-incident surface and the light-exit surface of the beam conversion element 220. The light transmission surface S1 includes the flat region **121*s*1 and the curved-surface region 122*s*, wherein the flat region 121*s*1 is configured to convert the first light L1 into the condensed light L21, and the curved-surface region 122*s* is configured to convert the first light L1 into the diffused light L22. Similarly, the light transmission surface S2 includes the flat region 121*s*2 and a curved-surface region 223*s*, wherein the flat region 121*s*2 is configured to convert the first light L1 into the condensed light L21, and the curved-surface region 223*s* is configured to convert the first light L1 into the diffused light L22**.

As illustrated in FIG. 7, the beam conversion element 220 includes the first portion 121, the second portion 122 and the third portion 223. The second portion 122 and the third portion 223 are connected to two opposite sides of the first portion 121 respectively. For example, the first portion 121 has the aforementioned flat regions **121*s*1 and 121*s*2, the second portion 122 has the aforementioned curved-surface region 122*s*, and the third portion 223 has the aforementioned curved-surface region 223*s*. The second portion 122 protrudes (for example, the curvature is defined as positive (+)) relative to the flat region 121*s*1 of the first portion 121, and the third portion 223 protrudes relative to the flat region 121*s*2 of the first portion 121. In another embodiment, the second portion 122 may be recessed (for example, the curvature is defined as negative (−)) relative to the flat region 121*s*1 of the first portion 121, while the third portion 223 may be recessed relative to the flat region 121*s*2 of the first portion 121. In other embodiment, the second portion 122 may be protruded or recessed relative to the flat region 121*s*1 of the first portion 121, and the third portion 223 may be recessed or protruded relative to the flat region 121*s*2 of the first portion 121. In addition, the entirety of the beam conversion element 220** is, for example, an integrally formed structure, and it may be formed of a material including, for example, plastic or glass.

Figure 8A:
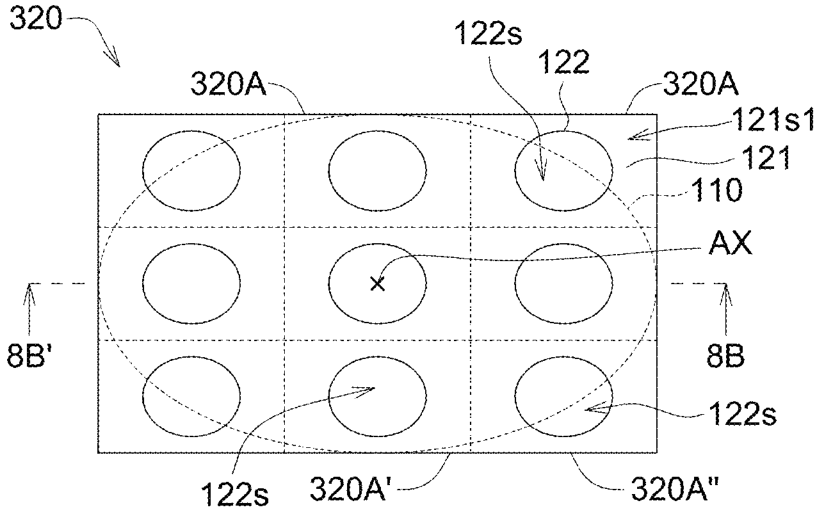
FIG. 8A illustrates a schematic diagram of a beam conversion element 320 according to another embodiment of the present invention.
Figure 8B:
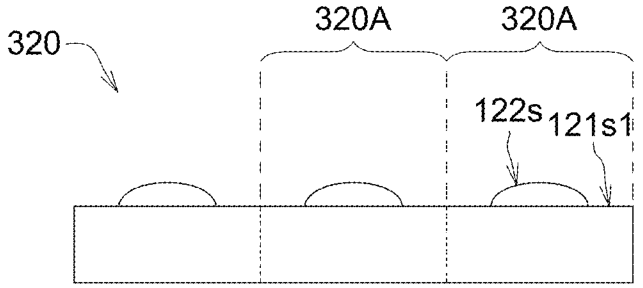
FIG. 8B illustrates a schematic diagram of a cross-sectional view of the beam conversion element 320 in FIG. 8A along the direction 8B-8B'.

Referring to FIGS. 8A and 8B, FIG. 8A illustrates a schematic diagram of a beam conversion element 320 according to another embodiment of the present invention, and FIG. 8B illustrates a schematic diagram of a cross-sectional view of the beam conversion element 320 in FIG. 8A along the direction 8B-8B'.

As illustrated in FIGS. 8A and 8B, the beam conversion element 320 includes a plurality of adjustment units 320A. Each adjustment unit 320A includes the aforementioned flat region **121*s*1 and curved-surface region 122*s*, or includes the aforementioned first portion 121 and second portion 122. A plurality of the adjustment units 320**A may be connected to each other and arranged in an n×m array, wherein n and m are positive integers equal to or greater than 1.

The dotted line range shown in FIG. 8A represents the overlapping range where the light-exit surface **110*s* of the first light source 110 is projected on the beam conversion element 320 in the direction of the optical axis AX of the first light L1. It may be seen from the dotted line range that the light-exit surface 110***s* overlaps the entirety of one (for example, the curved-surface region 122*s* of the adjustment unit 320A') of the curved-surface regions 122*s*, and overlaps a portion of another (for example, the curved-surface region 122*s* of the adjustment unit 320A") of the curved-surface regions 122*s*. Through the overlapping range design or the position design of the light-exit surface 110*s* and the beam conversion element 320, the corresponding (or different) relationship curve between the luminous angle and the illumination may be obtained.

Although not illustrated, in another embodiment, the adjustment unit 320A may include the flat region 121*s*1, the flat region 121*s*2, the curved-surface region 122*s* and the curved-surface region 223*s* in FIG. 7, or include the aforementioned first portion 121, second portion 122 and third portion 233.

Figure 9:
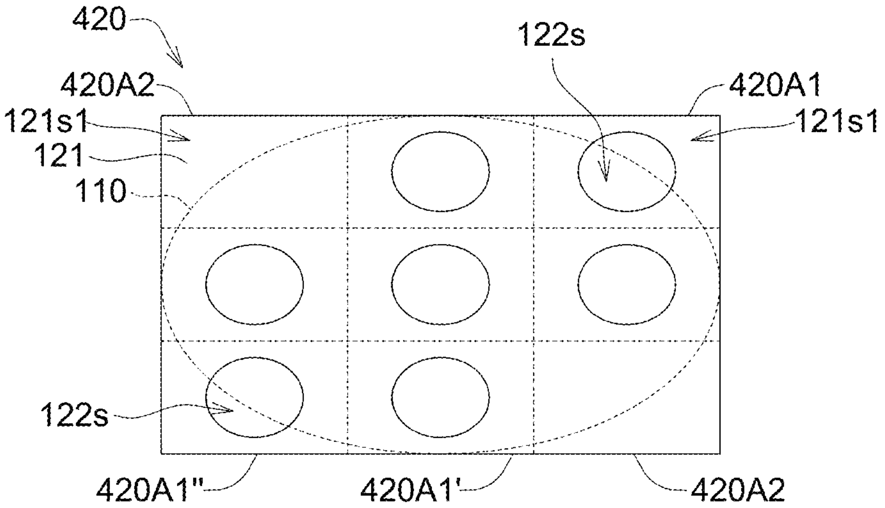
FIG. 9 illustrates a schematic diagram of a beam conversion element 420 according to another embodiment of the present invention.

Referring to FIG. 9, FIG. 9 illustrates a schematic diagram of a beam conversion element 420 according to another embodiment of the present invention. The beam conversion element 420 includes at least one adjustment unit 420A1 and at least one adjustment unit 420A2, wherein the adjustment unit 420A1 includes the aforementioned flat region 121*s*1 and curved-surface region 122*s*, or includes the aforementioned first portion 121 and second portion 122, and the adjustment unit 420A2 includes the aforementioned flat surface region 121*s*1, but does not include the curved-surface region 122*s*, or includes the aforementioned first portion 121 but does not include the second portion 122. A plurality of the adjustment units 420A is arranged in an n×m array, wherein n and m are positive integers equal to or greater than 1.

Although not illustrated, in another embodiment, the adjustment unit 420A1 may include the flat region 121*s*1, the flat region 121*s*2, the curved-surface region 122*s* and the curved-surface region 223*s* in FIG. 7, or the aforementioned first portion 121, second portion 122 and third portion 223, and the adjustment unit 420A2 may include the flat regions 121*s*1 and 121*s*2 in FIG. 7 but does not include the curved-surface region 122*s* and the curved-surface region 223*s*, or include the aforementioned first portion 121 but does not include the aforementioned second portion 122 and third portion 223.

The dotted line range shown in FIG. 9 represents the overlapping range where the light-exit surface 110*s* of the first light source 110 is projected on the beam conversion element 420 along the direction of the optical axis AX of the first light L1. It may be seen from the dotted line range that the light-exit surface 110*s* overlaps the entirety of one (for example, the curved-surface region 122*s* of the adjustment unit 420A') of the curved-surface regions 122*s*, overlaps a portion of another (for example, the curved-surface region 122*s* of the adjustment unit 420A") of the curved-surface regions 122*s*, and overlaps at least one portion of the flat region 121*s*1 of the adjustment unit 420A2. Through the overlapping range design or the position design of the light-exit surface 110*s* and the beam conversion element 420, the corresponding (or different) relationship curve between the luminous angle and the illumination may be obtained.

Figure 10:
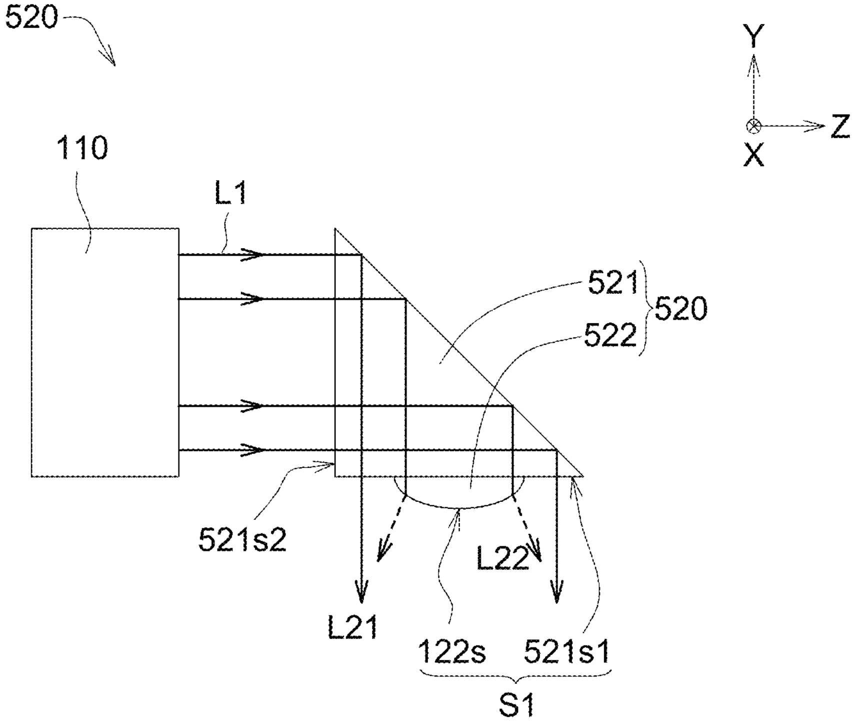
FIG. 10 illustrates a schematic diagram of a beam conversion element 520 according to another embodiment of the present invention.

Referring to FIG. 10, FIG. 10 illustrates a schematic diagram of a beam conversion element 520 according to another embodiment of the present invention. The light beam conversion element 520 includes a prism 521 and a curved-surface portion 522, and the curved-surface portion 522 is disposed on the prism 521. The beam conversion element 520 has the light transmission surface S1 and a light-incident surface 521*s*2. The prism 521 has the light-incident surface 521*s*2 configured to receive the first light L1. The light transmission surface S1 is, for example, the light-exit surface and includes a flat region 521*s*1 and the curved-surface region 122*s*. The prism 521 has the flat region 521*s*1, and the curved-surface portion 522 has the curved-surface region 122*s*. The flat region 521*s*1 is used for converting the first light L1 into the condensed light L21, and the curved-surface region 122*s* is configured to convert the first light L1 into the diffused light L22. In an embodiment, the entirety of the beam conversion element 520 is, for example, an integrally formed structure, and it may be formed of a material including, for example, plastic or glass.

Figure 11:
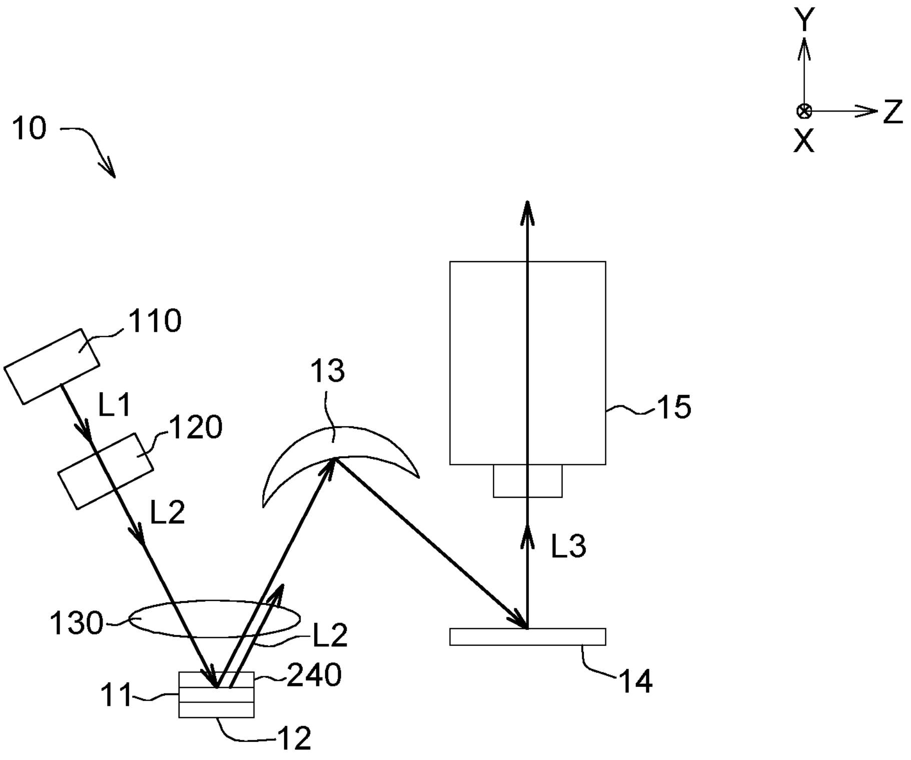
FIG. 11 illustrates a schematic diagram of a light source system 10 according to another embodiment of the present invention.

Referring to FIG. 11, FIG. 11 illustrates a schematic diagram of a light source system 10 according to another embodiment of the present invention. The light source system 10 includes the first light source 110, the beam conversion element 120, a lens 130, the wavelength conversion element 240, a second light source 11, a reflective element 12, a reflective element 13, a DMD (Digital Micromirror Device) 14 and a projection lens 15.

As illustrated in FIG. 11, the first light source 110 is configured to emit the first light L1. The beam conversion element 120 is configured to convert the first light L1 into condensed light L21 (not illustrated in FIG. 11) and diffused light L22 (not illustrated in FIG. 11). The condensed light L21 and diffused light L22 are mixed into an illumination light L2. The wavelength conversion element 240 is disposed between the second light source 11 and the lens 130 and is located at downstream position of the beam conversion element 120, and the lens 130 is disposed on a downstream position of the wavelength conversion element 240. The second light source 11 is disposed between the wavelength conversion element 240 and the reflective element 12. In the present embodiment, the illumination light L2 is projected to the front of the light source system 10 or a road surface through an optical path, wherein the optical path travels through the lens 130, the wavelength conversion element 240, the second light source 11, the reflective element 12, the second light source 11, the wavelength conversion element 240, the lens 130, the reflective element 13, the DMD 14 and projection lens 15.

The second light source 11 is, for example, an unpackaged die, which has light-transmissive property and may allow light to travel through. The second light source 11 may emit the second light L2 with the first wavelength. The wavelength conversion element 240 converts the first wavelength of the second light L2 into a second wavelength. The second light L2 of the second light source 11 may increase the intensity of the illumination light emitted from the light source system 10. The reflective element 12 and/or the reflective element 13 are, for example, reflective layers or reflective mirrors. The DMD 14 may convert the illumination light L2 into a patterned light L3, and the pattern of the patterned light L3 may be changed by the DMD 14.

Figure 12:
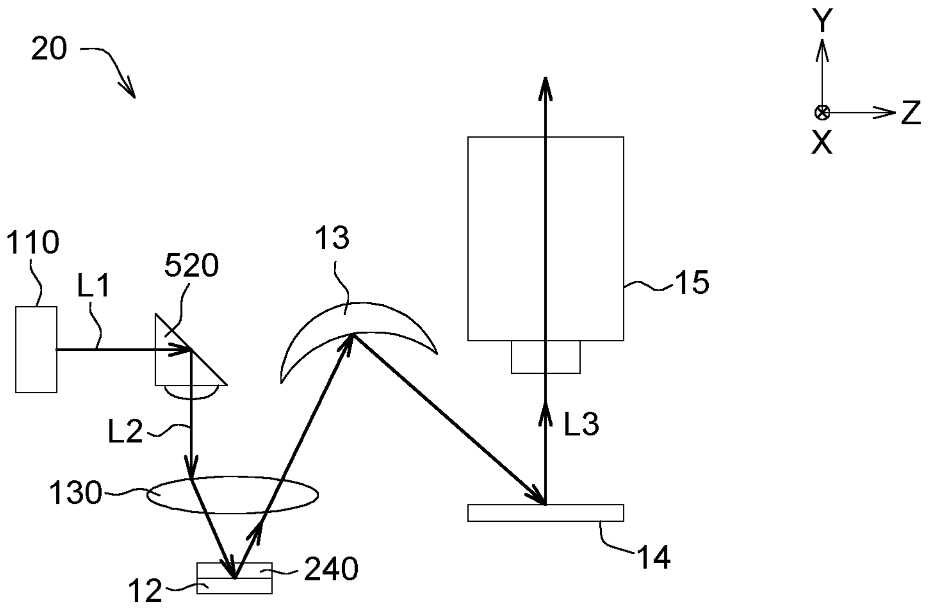
FIG. 12 illustrates a schematic diagram of a light source system 20 according to another embodiment of the present invention.

Referring to FIG. 12, FIG. 12 illustrates a schematic diagram of a light source system 20 according to another embodiment of the present invention. The light source system 20 includes the first light source 110, the beam conversion element 520, the lens 130, the wavelength conversion element 240, the reflective element 12, the reflective element 13, the DMD 14 and the projection lens 15.

As illustrated in FIG. 12, the first light source 110 is configured to emit the first light L1. The beam conversion element 520 is configured to convert the first light L1 into condensed light L21 (not illustrated in FIG. 12) and the diffused light L22 (not illustrated in FIG. 12). The condensed light L21 and the diffused light L22 are mixed into the illumination light L2. The wavelength conversion element 240 is disposed between the reflective element 12 and the lens 130 and is located at the downstream position of the beam conversion element 120. The lens 130 is disposed on the downstream position of the wavelength conversion element 240. In the present embodiment, the illumination light L2 is projected to the front of the light source system 20 or the road surface through an optical path, wherein the optical path travels through the lens 130, the wavelength conversion element 240, the reflective element 12, the wavelength conversion element 240, the lens 130, the reflective element 13, the DMD 14 and projection lens 15.

In another embodiment, similar to FIG. 11, the second light source 11 may be disposed between the wavelength conversion element 240 and the reflective element 12.

Figure 13:
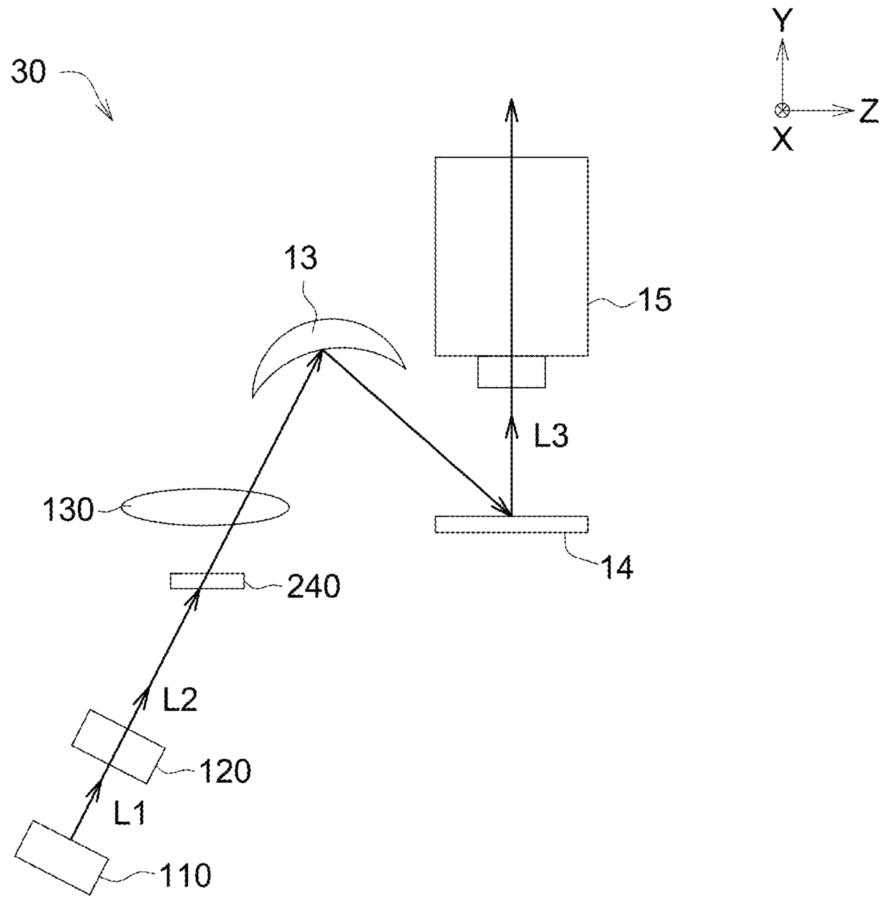
FIG. 13 illustrates a schematic diagram of a light source system 30 according to another embodiment of the present invention.

Referring to FIG. 13, FIG. 13 illustrates a schematic diagram of a light source system 30 according to another embodiment of the present invention. The light source system 30 includes the first light source 110, the beam conversion element 120, the lens 130, the wavelength conversion element 240, the reflection element 13, the DMD 14 and the projection lens 15.

As illustrated in FIG. 13, the first light source 110 is configured to emit the first light L1. The beam conversion element 120 is configured to convert the first light L1 into the condensed light L21 (not illustrated in FIG. 12) and the diffused light L22 (not illustrated in FIG. 12). The condensed light L21 and the diffused light L22 are mixed into the illumination light L2. The wavelength conversion element 240 is disposed between the beam conversion element 120 and the lens 130 and is located at the downstream position of the beam conversion element 120. The lens 130 is disposed on the downstream position of the wavelength conversion element 240. In this embodiment, the illumination light L2 is projected to the front of the light source system 30 or the road surface through an optical path, wherein the optical path travels through the wavelength conversion element 240, the lens 130, the reflective element 13, the DMD 14 and the projection lens 15.

Figure 14:
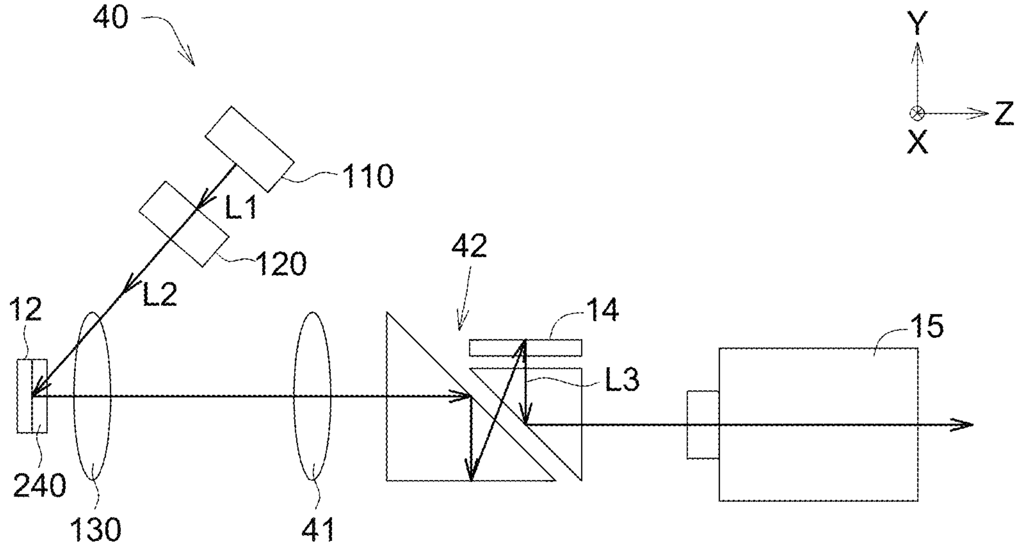
FIG. 14 illustrates a schematic diagram of a light source system 40 according to another embodiment of the present invention.

Referring to FIG. 14, FIG. 14 illustrates a schematic diagram of a light source system 40 according to another embodiment of the present invention. The light source system 40 includes the first light source 110, the beam conversion element 120, the lens 130, the wavelength conversion element 240, the reflection element 12, a lens 41, a prism assembly 42, a DMD 14 and a projection lens 15.

As illustrated in FIG. 14, the first light source 110 is configured to emit the first light L1. The beam conversion element 120 is configured to convert the first light L1 into the condensed light L21 (not illustrated in FIG. 14) and the diffused light L22 (not illustrated in FIG. 14). The condensed light L21 and the diffused light L22 are mixed into the illumination light L2. The wavelength conversion element 240 is disposed between the reflective element 12 and the lens 130 and is located at the downstream position of the beam conversion element 120. The lens 130 is disposed on the downstream position of the wavelength conversion element 240. In the present embodiment, the illumination light L2 is projected to the front of the light source system 40 or the road surface through an optical path, wherein the optical path travels through the lens 130, the wavelength conversion element 240, the reflective element 12, the wavelength conversion element 240, the lens 130, the lens 41, the prism assembly 42, the DMD 14 and the projection lens 15.

Figure 15:
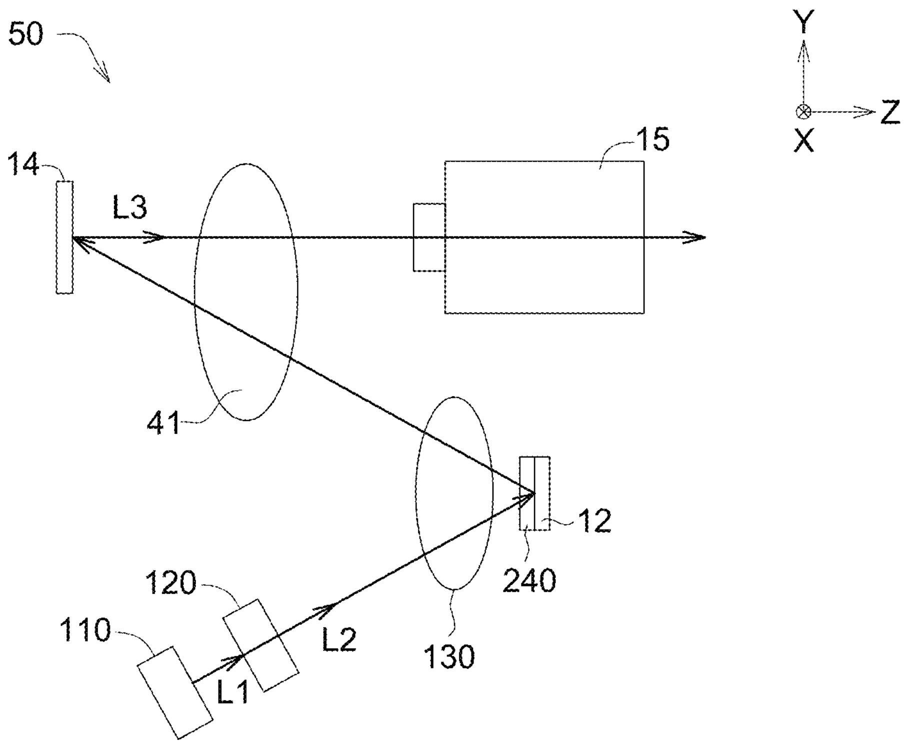
FIG. 15 illustrates a schematic diagram of a light source system 50 according to another embodiment of the present invention.

Referring to FIG. 15, FIG. 15 illustrates a schematic diagram of a light source system 50 according to another embodiment of the present invention. The light source system 50 includes the first light source 110, the beam conversion element 120, the lens 130, the wavelength conversion element 240, the reflection element 12, the lens 41, the DMD 14 and the projection lens 15.

As illustrated in FIG. 15, the first light source 110 is configured to emit the first light L1. The beam conversion element 120 is configured to convert the first light L1 into the condensed light L21 (not illustrated in FIG. 14) and the diffused light L22 (not illustrated in FIG. 14). The condensed light L21 and the diffused light L22 are mixed into illumination light L2. The wavelength conversion element 240 is disposed between the reflective element 12 and the lens 130 and is located at the downstream position of the beam conversion element 120. The lens 130 is disposed on the downstream position of the wavelength conversion element 240. In the present embodiment, the illumination light L2 is projected to the front of the light source system 50 or the road surface through an optical path, wherein the optical path travels through the lens 130, the wavelength conversion element 240, the reflective element 12, the wavelength conversion element 240, the lens 41, and the DMD 14, the lens 41 and projection lens 15.

In an embodiment, the wavelength conversion element of any embodiment herein is rotatably disposed on the downstream position of the beam conversion element. In another embodiment, the wavelength conversion element of any embodiment herein may be fixedly disposed on the downstream position of the beam conversion element.

Figure 16:
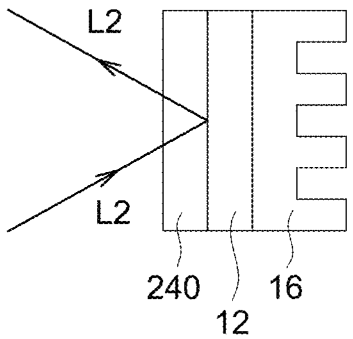
FIG. 16 illustrates a schematic diagram of a heat dissipation sink 16 disposed on a wavelength conversion element of a light source system according to another embodiment of the present invention.

Referring to FIG. 16, FIG. 16 illustrates a schematic diagram of a heat dissipation sink 16 disposed on a wavelength conversion element of a light source system according to another embodiment of the present invention. The light source system of any of the aforementioned embodiments may further include the heat dissipation sink 16 disposed adjacent to the wavelength conversion element 240. For example, the reflective element 12 is connected to the wavelength conversion element 240. Alternatively, the heat dissipation sink 16 may be directly connected or be connected to the wavelength conversion element 240 of the light source system of any of the aforementioned embodiments through thermally conductive glue.

In addition, the beam conversion element of the light source system of any of the aforementioned embodiments may be replaced by the beam conversion element of another embodiment.

To sum up, the light source system includes a first light source and a beam conversion element. The first light source emits a first light to the beam conversion element. The beam conversion element is transparent and may convert the first light into an illumination light (a mixed light of the condensed light and the diffused light), the illumination light provides a light pattern with a concentrated brightness in a middle portion and an uniform brightness in an edge portion. The beam conversion element has at least one light transmission surface, wherein the light transmission surface includes a flat region and a curved-surface region. The flat region surrounds the curved-surface region to achieve the aforementioned light pattern. In another embodiment, the light source system further includes a wavelength conversion element and a reflective element. The reflective element is disposed on a downstream position of the wavelength conversion element to reflect the illumination light. In other embodiments, the light source system further includes a second light source which is disposed between the reflective element and the wavelength conversion element to provide the second light and increase the overall intensity of the illumination light of the light source system.

While the invention has been described by way of example and in terms of the preferred embodiment (s), it is to be understood that the invention is not limited thereto. Based on the technical features embodiments of the present invention, a person ordinarily skilled in the art will be able to make various modifications and similar arrangements and procedures without breaching the spirit and scope of protection of the invention. Therefore, the scope of protection of the present invention should be accorded with what is defined in the appended claims.

What is claimed is:

1. A light source system, comprising:

a first light source configured to emit a first light; and a beam conversion element configured to convert the first light into a condensed light and a diffused light;

wherein the beam conversion element has a light transmission surface, the light transmission surface comprises a flat region and a curved-surface region, the flat region completely surrounds the curved-surface region, the flat region is configured to convert the first light into the condensed light, and the curved-surface region is configured to convert the first light into the diffused light;

wherein the first light, the condensed light and the diffused light have the same wavelength.

2. The light source system according to claim 1, wherein the curved-surface region is protruded or recessed relative to the flat region.

3. The light source system according to claim 1, wherein the flat region and the curved-surface region form an adjustment unit, the beam conversion element comprises a plurality of the adjustment units, and the adjustment units are arranged in an n×m array, where n and m are positive integers equal to or greater than 1.

4. The light source system according to claim 3, wherein the first light source has a light-exit surface, the light-exit surface overlaps the entirety of one of the curved-surface regions and overlaps a portion of another of the curved-surface regions along a direction of an optical axis of the first light.

5. The light source system according to claim 1, wherein the beam conversion element comprises a plurality of adjustment units, one of the adjustment units comprises the flat region and the curved-surface region, and another of the adjustment units comprises the flat region but does not comprise the curved-surface region.

6. The light source system according to claim 1, wherein the flat region has an area accounting for more than 10% of an area of the light transmission surface.

7. The light source system according to claim 1, wherein the flat region has an area accounting for 10% to 90% of an area of the light transmission surface.

8. The light source system according to claim 1, wherein the first light source has a light-exit surface, the light-exit surface overlaps the entirety of the curved-surface region along a direction of an optical axis of the first light.

9. The light source system according to claim 1, further comprising:

a lens;

wherein the beam conversion element is disposed between the lens and the first light source.

10. The light source system according to claim 1, wherein the condensed light and the diffused light have a first wavelength, and the light source system further comprises:

a lens; and a wavelength conversion element disposed on a downstream position of the lens and configured to convert the first wavelength into a second wavelength, wherein the second wavelength is different from the first wavelength;

wherein the beam conversion element is disposed between the lens and the first light source.

11. The light source system according to claim 1, further comprising:

a wavelength conversion element;

a lens; and a second light source configured to emit a second light to the wavelength conversion element;

wherein the wavelength conversion element is disposed between the second light source and the lens.

12. The light source system according to claim 11, further comprising:

a reflective element;

wherein the second light source is disposed between the wavelength conversion element and the reflective element.

13. The light source system according to claim 1, wherein the beam conversion element comprises:

a prism; and a curved-surface portion disposed on the prism and having the curved-surface region.

14. The light source system according to claim 13, wherein the prism and the curved-surface portion are integrally formed into one piece.

15. The light source system according to claim 13, wherein the prism has a light-incident surface and the flat region, the light-incident surface is configured to receive the first light, and the curved-surface portion has the curved-surface region.

16. The light source system according to claim 1, wherein the condensed light and the diffused light have a first wavelength, and the light source system further comprises:

a wavelength conversion element configured convert the first wavelength into a second wavelength, wherein the second wavelength is different from the first wavelength; and a lens disposed on a downstream portion of the wavelength conversion element.

17. The light source system according to claim 1, wherein the condensed light and the diffused light have a first wavelength, and the light source system further comprises:

a wavelength conversion element rotatably disposed on a downstream position of the beam conversion element and configured to convert the first wavelength into a second wavelength, wherein the second wavelength is different from the first wavelength.

18. The light source system according to claim 1, wherein the condensed light and the diffused light have a first wavelength, and the light source system further comprises:

a wavelength conversion element fixedly disposed on a downstream position of the beam conversion element, and configured to convert the first wavelength into a second wavelength, wherein the second wavelength is different from the first wavelength; and a heat dissipation sink connected to the wavelength conversion element.

19. The light source system according to claim 1, wherein the light beam conversion element has two opposite light transmission surfaces.

20. The light source system according to claim 1, wherein a shape of the curved-surface region is a circle, an ellipse or a polygon.

* * * * *